United States Patent [19]
Belser

[11] Patent Number: 6,018,512
[45] Date of Patent: Jan. 25, 2000

[54] SYSTEM AND METHOD OF ENCODING FOR IDENTIFYING A GIVEN SURFACE AMONG SEVERAL IDENTICALLY PATTERNED DISK SURFACES

[75] Inventor: Karl A. Belser, San Jose, Calif.

[73] Assignee: Seagate Technology, Inc., Scotts Valley, Calif.

[21] Appl. No.: 08/972,620

[22] Filed: Nov. 18, 1997

[51] Int. Cl.[7] ........................................ G11B 3/70
[52] U.S. Cl. ........................................... 369/281
[58] Field of Search .................... 369/281, 282; 360/98.03, 99.05, 99.12

[56] References Cited

U.S. PATENT DOCUMENTS

| 4,390,912 | 6/1983 | Hertrich et al. | 360/78.14 |
| 4,670,803 | 6/1987 | DeMoss et al. | 360/133 |

FOREIGN PATENT DOCUMENTS

0455205A1  11/1991  European Pat. Off. .
0567086A1  10/1993  European Pat. Off. .

OTHER PUBLICATIONS

Patent Abstracts of Japan, vol. 010, No. 215 (P–481), Jul. 26, 1986 & JP 61 054055 A (Toshiba Corp.) Mar. 18, 1986.

*Primary Examiner*—George J. Letscher
*Attorney, Agent, or Firm*—Carr & Ferrell LLP; Gregory J. Koerner; Charles B. Katz

[57] ABSTRACT

A system and method is disclosed for assembling a pre-formatted top half and a pre-formatted bottom half of a disk platter, and for further assembling pre-formatted disk platters into a multi-platter MO disk drive, with the servo sectors in a predetermined rotational alignment and with the tracks in good radial alignment. Because of the known rotational alignment of the servo sectors, it is possible to have independent verification of the operation of the flying MO head switch. This independent verification prevents data corruption due to an unreliable flying MO head switch.

13 Claims, 6 Drawing Sheets

SYSTEM AND METHOD OF ENCODING FOR IDENTIFYING A GIVEN SURFACE AMONG SEVERAL IDENTICALLY PATTERNED DISK SURFACES

BACKGROUND OF THE INVENTION

1. Field of the Invention

This invention relates generally to memory systems and more particularly to a system and method for identifying any one surface from among several surfaces which are identically patterned in a stack of memory storage disks.

2. Description of the Background Art

Providing reliable storage and retrieval techniques for digital information is an important consideration of manufacturers, designers and users of computing systems. In magneto-optical (MO) storage devices that use flying heads, digital data is written onto and read from the exposed surfaces on either side of rotating MO disk platters. This digital data is typically written into and read from a series of circular concentric tracks located on the surfaces of the disk platters. In practice, the digital data is read from the exposed surfaces of the disk platters by projecting a laser-generated light beam from a flying MO head onto a selected track while the disk platter is rotating, and then sensing the amplitude and polarization of light reflected back from the surface of the disk platter. Periodically occurring in each track are embedded servo-sector markings. Corresponding servo-sector markings from adjacent tracks are grouped together in the form of narrow radial segments, which allow for precision random-access locating of the data.

Prior to reading data from or writing data to MO disk platters, the platters must be formatted. Formatting refers to the process of writing the servo-sector and track markings onto the platters. This could be accomplished in one of two ways: soft sectoring or hard sectoring. In the soft sectoring process, virgin platters are assembled into a complete disk assembly. Then the servo-sector and track markings are written to the surfaces of the platters using the flying MO heads of the disk assembly. Soft sectoring has certain technical advantages, but has one great cost disadvantage. It requires large amounts of time, often many hours, during the manufacturing process to perform the soft-sector formatting. To stay economically competitive, most MO disk drive manufacturers have therefore opted for hard sectoring.

In the hard-sector formatting process, the servo sector and track markings are stamped into the raw MO disk platters during the platter manufacturing process. In a typical process, a pair of polycarbonate plastic blanks are each coated on one side, the media side, with a thin magnetic film, and then each is stamped in a female mold. These two disk halves are then glued together at the sides opposite the media sides, the glue sides. It takes only a few seconds to stamp and glue together an MO disk platter in this manner, and therefore this method yields great cost savings when compared with soft sector formatting. Additional cost savings accrue from formatting all of the platters identically. These cost savings come from the tooling cost savings from having only one pair of molds (for top halves and bottom halves of the platters) and the inventory cost savings from only needing to stock one kind of platter. It is thus advantageous to use all identical hard-sectored platters. However, there are certain technical problems encountered when using hard-sector formatting.

One technical problem associated with identical hard-sector formatting in a multi-platter MO disk is that there is no technical method available to validate which platter's surface is being accessed simply by reading the servo-sector and track markings. Currently, in a multi-platter MO disk, the drive electronics select a particular flying MO head via a head switch, and makes the assumption that there is a one-to-one correspondence between selected flying heads and MO disk platter surfaces. This assumption is false in the event that the head switch is not perfectly reliable. If, for example, the head switch was commanded to connect the drive electronics to the flying MO head corresponding to the top surface of MO disk platter number 1, and the head switch mistakenly connected the drive electronics to the flying MO head corresponding to the top surface of MO disk platter number 2, it would likely follow that data intended to be written on the top surface of MO disk platter number 1 would instead be mistakenly written on the top surface of MO disk platter number 2. This inability to independently validate the operation of the flying head switch thus may lead to data corruption in the MO disk.

A second problem concerns the radial position alignment of the tracks. The geometric center of the hole punched in the middle of the disk halves is not necessarily the same as the geometric center of the hard-sector tracks. When the top and bottom halves of the disk platter are glued together, the geometric centers of the tracks on the top half and on the bottom half will not be aligned. This causes head tracking problems which may only be overcome at the cost of more complicated servo drive electronics.

This second problem continues when the assembled disk platters are mounted on a common rotational spindle to form a multi-platter disk drive. Not only are the tracks on the top and bottom halves of each platter not in radial alignment with each other, but also the tracks on the various platters are not in radial alignment with respect to the common rotational axis of the spindle. This again causes head tracking problems which may only be overcome by servo drive electronics.

Referring now to FIG. 1A, an exploded view of the assembly of a double-sided MO disk platter 110 is shown. Looking at the media side 112 of the top half 114, if the top half 114 rotates in a counter-clockwise direction, the attached bottom half 116 will rotate (in reference to its own media side 118) in a clockwise direction. Because the data in the servo sectors 120 must be read in sequential order as the data bits pass the heads, the data in the servo sectors 120 needs to be written in different directions on the top half 114 and bottom half 116. Therefore the top half 114 and the bottom half 116 each require their own mold. In FIG. 1A the top half 114 and the bottom half 116 have previously been pressed, respectively, in a top half mold and a bottom half mold (not shown). They are then glued together to form a double-sided disk platter 110 as shown in FIG. 1A with the hard-sector formatted surfaces exposed on the outside.

Conventionally the top half 114 and the bottom half 116 are glued together in random rotational relationship. They are also glued together in poor radial alignment. This is because there exist no alignment markings which can be interpreted with an assembly-line quality microscope or which can be selected with alignment tooling. There are flying MO head readable markings on the hard-sectored platters' surfaces, but these markings take the form of embossed pits or polarization-shifted patches of approximately 0.7 microns across. It would be necessary to read several of these patches in sequence to determine which servo sector was being examined. This is not practicable using current assembly line equipment or techniques.

Referring now to FIG. 1B, a pair of conventional disk platters 110 for a two disk platter MO disk drive is shown.

These disk platters 110 are mounted for rotation on a spindle 122. The disk platters 110 are assembled in random rotational alignment and in poor radial alignment for the same reason that the two halves 114, 116, of each platter are assembled in random rotational alignment and in poor radial alignment: there exist no markings on the platters which could be used by an assembler to mount the platters on the spindle with a known rotational alignment or to align the geometric centers of the tracks. Because the platters are assembled in random rotational alignment, there exists no indication which would independently show that the flying MO head switch correctly switched the heads. For example, consider switching from the head on the upper surface 128 of disk 1 124 to the head on the lower surface 134 of disk 2 126. An instant before the switch was commanded to change heads, the head on the upper surface 128 of disk 1 124 was over a known servo sector. Once the switch changes heads, data from a new surface will be read. The drive electronics may be able to determine if the head which has just been connected is over an upper surface or a lower surface because the upper surfaces and lower surfaces, stamped in different molds, may contain different format information. However, because all the bottom halves of the disk platters are identical, there is no independent way to know if the switch correctly changed to the head over the lower surface 134 of disk 2 126 or incorrectly changed to the head over the lower surface 130 of disk 1 124.

Similarly, because the platters are assembled on the spindle without regard for radial alignment, the tracks are in poor radial alignment with respect to the rotational axis of the spindle.

Therefore there exists a need for a system and a method for assembling the top halves and bottom halves of the disk platters, and the disk platters in a multi-platter MO disk drive, in a known rotational alignment and in good radial alignment of the servo sectors and tracks.

SUMMARY OF THE INVENTION

In accordance with the present invention, a system and method are disclosed for assembling both the top halves and the bottom halves of a disk platter, and the disk platters in a multi-platter MO disk drive, in a known rotational alignment of the servo sectors and with good radial alignment of the tracks. In the preferred embodiment of the present invention, disk platters are created by gluing together top halves and bottom halves which have been previously hard-sector formatted by stamping in a pair of molds. In addition to having hard-sector formatting markings, the molds also include fiducial markings which allow an assembler to identify and precisely locate certain of the hard-sector format markings during the assembly of the multi-platter MO disk drive.

When gluing together the top halves and bottom halves of disk platters, the fiducial markings allow the assembler to align the number zero servo sectors on both surfaces. These same fiducial markings also allow the assembler to adjust the relative radial alignment of the halves in order to align the geometric centers of the tracks.

The fiducial markings further allow the assembler to assemble the multiple platters on a spindle in a predetermined and useful rotational orientation. Each platter will be installed on the spindle with the platter's number zero servo sector rotated a fixed number of degrees with respect to the neighboring platters. Thus when switching from one head to another there will be an anticipated servo sector number. If the anticipated servo sector number does not match the servo sector number actually read, this indicates a failure in the flying MO head switch assembly. This independent failure indication may be used to prevent data corruption in the MO disk drive.

After the platters have been installed on the spindle and rotated a fixed amount as described above, the assembler may then further use the fiducial markings to adjust the radial position of each platter so that the geometric center of the tracks is aligned with the axis of rotation of the spindle.

DETAILED DESCRIPTION OF THE PREFERRED EMBODIMENT

The present invention comprises a system and method for assembling both the top halves and the bottom halves of a disk platter, and the disk platters in a multi-platter MO disk drive, with the servo sectors in a predetermined rotational alignment and with good radial alignment of the tracks. Because of the known rotational alignment of the servo sectors, it is possible to have independent verification of the operation of the flying MO head switch. This independent verification prevents data corruption due to an unreliable flying MO head switch. And because of the good radial alignment of the tracks, the MO disk drive may be constructed with a less complicated and therefore more efficient and less costly head tracking servo electronics system. The radial alignment further allows the data on each surface to be written closer to the edges of the disk.

Figure 1A:
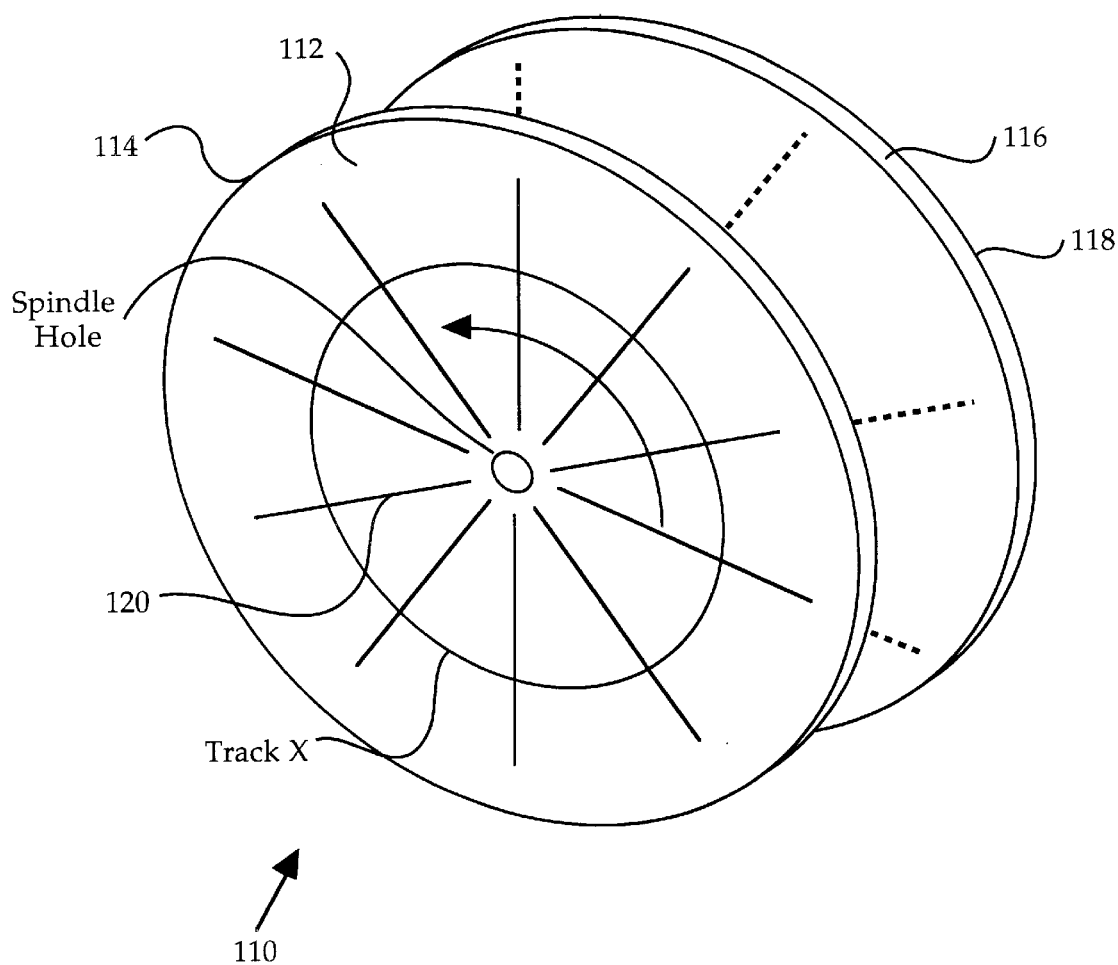
FIG. 1A is an exploded view of a magneto-optical disk platter, showing the spatial relationship of the top half and the bottom half.
Figure 1B:
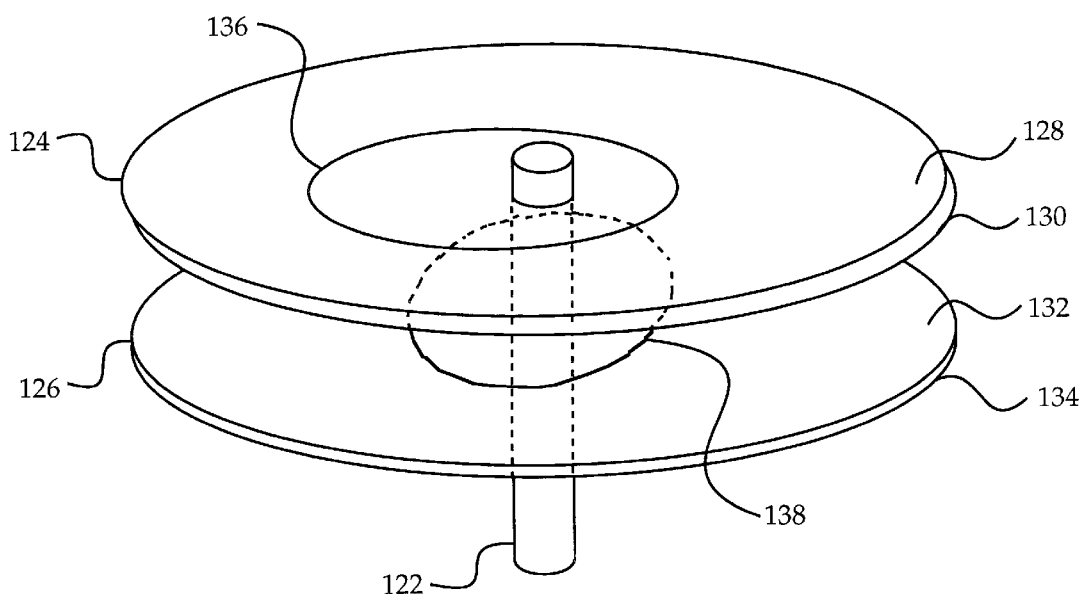
FIG. 1B is an elevation view of a two platter magneto-optical disk drive.
Figure 2:
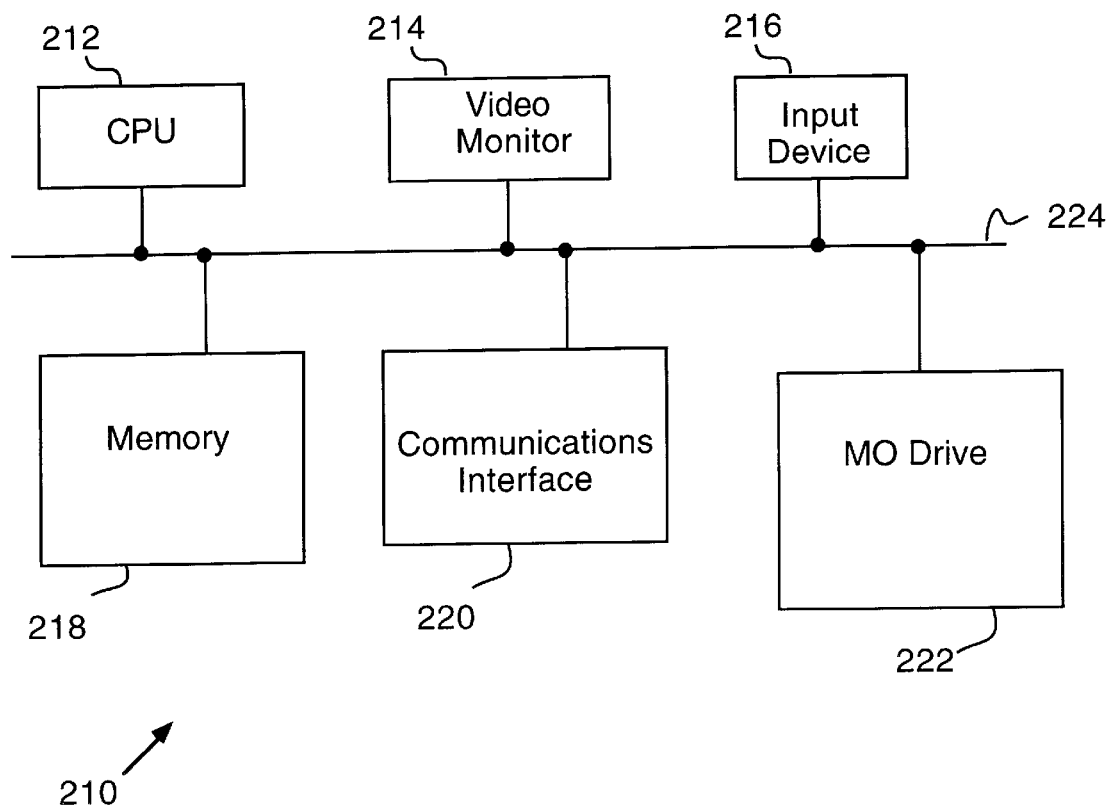
FIG. 2 is a block diagram of a computer system including a magneto-optical drive, according to the present invention.

Referring now to FIG. 2, a computer 210 is shown according to the present invention. Computer 210 preferably comprises a central processing unit (CPU) 212, a video monitor 214, an input device 216, a memory 218, a communications interface 220 and a magneto-optical drive 222. Each element of computer 210 is preferably coupled to a common system bus 224. Memory 218 may alternatively comprise various storage-device configurations, including Random-Access-Memory (RAM), Read-Only-Memory (ROM) and non-volatile storage devices such as floppy-disks. Magneto-optical drive 222 receives, stores and retrieves various types of digital information and is further discussed below in conjunction with FIGS. 3 through 6.

Figure 3:
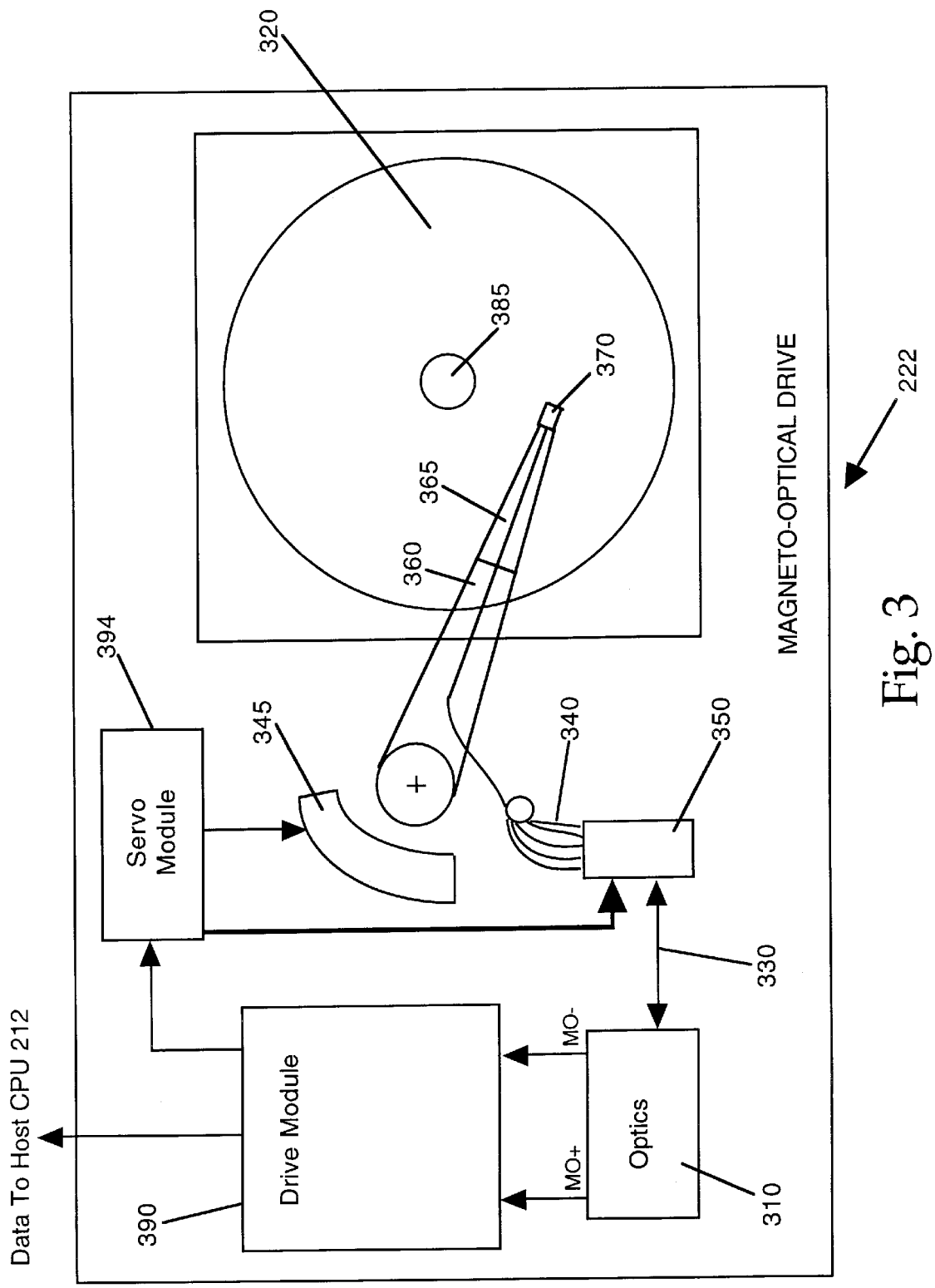
FIG. 3 is a pictorial view of the magneto-optical drive of FIG. 2, according to the present invention.

Referring now to FIG. 3, a pictorial view of the FIG. 2 magneto-optical drive 222 is shown. In the present invention, the mechanical architecture of magneto-optical drive 222 incorporates Flying Magneto-Optical (FMO) head technology with Winchester-type rotary actuator arm, suspension, and air bearing technology in a Magneto-Optical (MO) data storage system. In the preferred embodiment, magneto-optical drive 222 includes optics assembly 310, a Single-Mode Polarization Maintaining (SMPM) optical fiber 330, a fiber optic switch 350, an actuator magnet and coil 345, a plurality of SMPM optical fibers 340, a plurality of head arms 360, a plurality of suspensions 365, a plurality of FMO heads 370, a drive module 390, a servo module 394 and a plurality of present invention MO disk platters 320.

Each of the plurality of MO disk platters 320 are preferably mounted on a spindle 385 for continuous rotation at a constant angular velocity and each of the plurality of FMO heads 370 are preferably attached via a respective flexible suspension 365 and head arm 360 to the electromagnetic actuator magnet and coil 345. Those skilled in the art will recognize that MO drive 222 may comprise as few as one FMO head 370 and one MO disk platter 320 or an upper and lower FMO head 370 per a plurality of MO disk platters 320.

Figure 4:
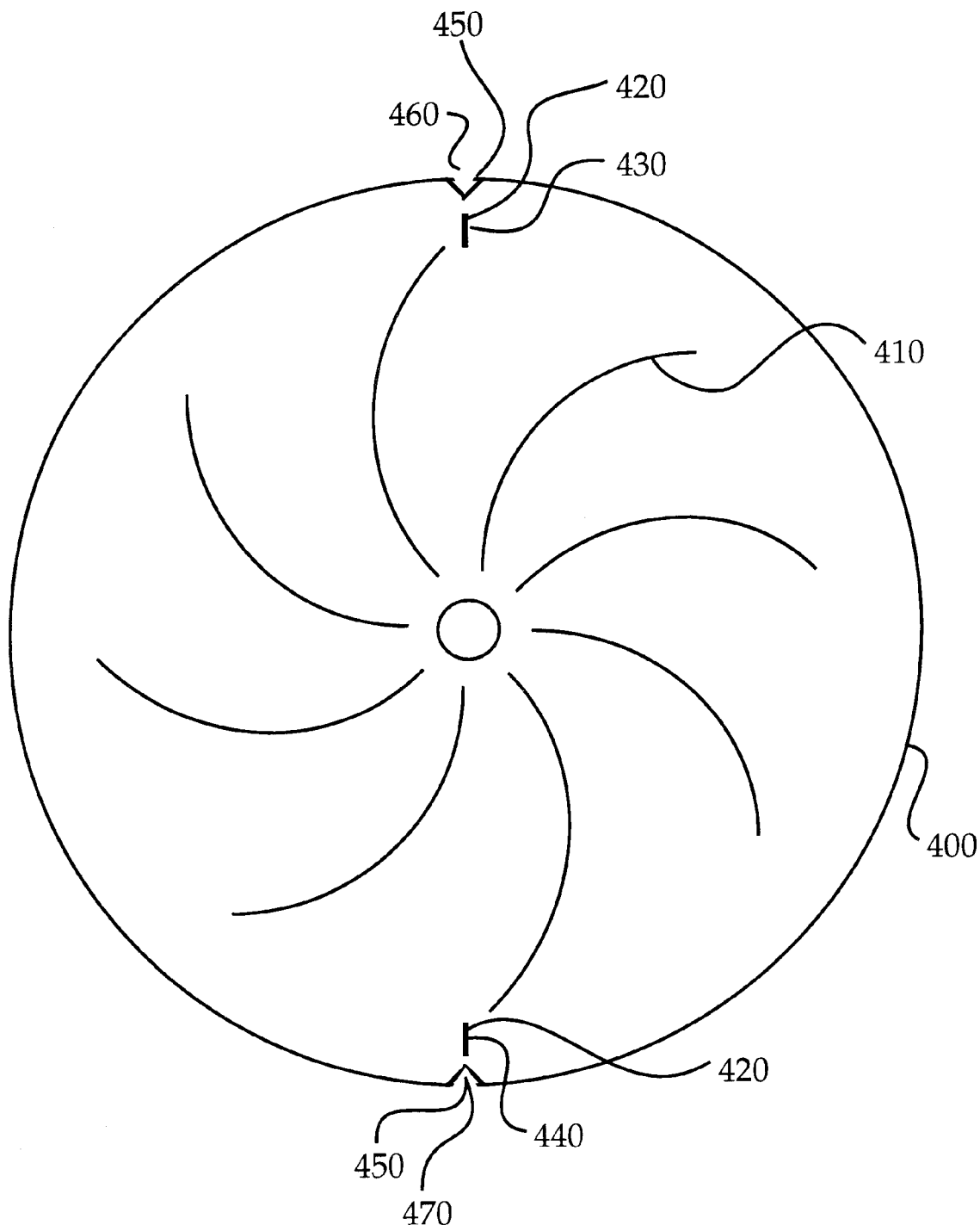
FIG. 4 is a simplified view of the hard-sectored markings and fiducials on a top half of a magneto-optical disk platter, according to the present invention.

Referring now to FIG. 4, a top half 400 of an MO disk platter 320 is shown in accordance with the present invention. The wedge-shaped servo sectors 410 are shown in the form of an arc because the FMO heads 370 will trace an arc when moved by the head arms 360 using the rotary actuator magnet and coil 345. The curvature of the arc is exaggerated in FIG. 4 for purposes of illustration. Additionally, only eight arced wedge-shaped servo sectors 410 are shown in FIG. 4, however an MO disk platter 320 typically contains a significantly larger number of servo sectors 410.

In each servo sector 410 there exists a stamped pattern of microscopic depressions in the surface of the MO disk platter 320. These depressions change the reflectivity of the surface and thus may be detected by the FMO head 370. Each servo sector 410 contains, among other things, a sector number encoded in these stamped depressions. These sector numbers are not readable with ordinary assembly-line magnifiers, as the sector numbers are encoded by slight variations in reflectivity and the depressions are very small (about 0.7 microns across).

In accordance with the preferred embodiment of the present invention, additional markings, called fiducials 420, are designed into the molds for the MO disk platters. These fiducials 420 are then stamped onto the surface of the MO disk platters 320 in precise alignment with certain of the arced wedge-shaped servo sectors at the same time that the servo sectors 410 are stamped onto the surface of the MO disk platters 320. Each fiducial 420 includes two attributes: a precise location mark, and a sequence mark which is readable by a human assembler with a simple assembly-line magnifier. The sequence mark may take the form of a number or letter, or some other easily recognizable symbol.

The minimum number of fiducials 420 depends upon the number of MO disk platters 320 used in the MO disk drive 222. In the preferred embodiment, there are N fiducials 420, numbered 0 through (N-1), placed upon the surfaces of the MO disk platters 320 in an N platter MO disk drive 222. In the special case of a single platter MO disk drive, there are 2 fiducials 420 upon the surfaces of the MO disk platters 320 in order to 14 achieve radial alignment between the two halves. The number 0 fiducial 430 is placed adjacent to the servo sector numbered 0. The other fiducials 420 are evenly and circumferentially spaced at 360/N degrees apart, equi-distant along the edge of each MO disk platter 320. The circumferential spacing is preferably in the opposite direction of disk rotation, so that the FMO head 370 passes the servo sectors 4 10 associated with the fiducials 420 in numerical order. This means that the fiducials 420 will be spaced in opposite directions on the top half 400 of the MO disk platter 320 and on the bottom half (not shown) of the MO disk platter 320.

In the example of FIG. 4, the top half 400 of an MO disk platter 320 is shown for an MO disk drive 222 with two MO disk platters 320. Because there are two platters, there are two fiducials 420. The number 0 fiducial 430 is placed adjacent to the servo sector numbered 0, and the number 1 fiducial 440 is placed 360/N=360/2=180 degrees away from it around the circumference of the top half of the MO disk platter 320. The same number of fiducials 420 are placed on the bottom half of the MO disk platter (not shown). Again the number 0 fiducial 430 is placed adjacent to the servo sector numbered 0, and the number 1 fiducial 440 is placed 180 degrees away from the number 0 fiducial 430.

In one embodiment of the present invention, the fiducial marks 430 are directly used to glue together of the top half 400 of the MO disk platter 320 and the bottom half of the MO disk platter 320 into a unitary MO disk platter 320. Glue is placed on the glue sides of the top half and bottom half of the MO disk platter 320, and then the glued sides may be pressed together with an alignment tool through their central spindle holes. The two halves may then be rotated with respect to one another until the number 0 fiducials 430 are lined up. This may be accomplished using a carefully collimated pair of magnifiers.

Once the two halves are in rotational alignment, the halves may be adjusted in the radial direction until the fiducial marks 420 are exactly opposite one another. The glue is then allowed to set.

In another embodiment of the present invention, the fiducial marks 420 are used to align a cutting tool which cuts narrow wedge shaped notches 450 in the edges of the top half 400 and bottom half of the MO disk platter 320. The notches 450 are cut in precise alignment to the fiducials 420. Notice that the notches 450 are included in the definition of fiducials 420, as they include a precise location mark. In production, as multiple top halves and bottom halves are notched, they may be racked with the particular notches 460 adjacent to the number 0 fiducial 430 pointing in a known direction for ease in subsequent handling. Once the top half and bottom half of an MO disk platter 320 are notched, they may be glued together while using a pair of knife-edged tools for alignment. The top half 400 and bottom half of the MO disk platter 320 may be glued together with slow-setting adhesive while the assembler roughly aligns the notches 450. This roughly aligned MO disk platter 320 is then placed so that the knife-edged tools fit into the notches 450, and when the knife-edged tools are pressed towards the center of the top and bottom half they precisely align the top half 400 and the bottom half. Notice that the knife-edged tools simultaneously align the halves both rotationally and radially. After the glue sets, the finished MO disk platters 320 may be removed from the tools.

Although the above two embodiments of the present invention were presented with an example in which the MO disk platters 320 had two fiducials 420 per side (corresponding to use in a two-disk-platter MO disk drive 222) similar methods may be used to glue together the top half 400 and bottom half of an MO disk platter 320 with three or more fiducials 420 (corresponding to a three or more disk platter MO disk drive 222). The method of the prior embodiment would be the same as for the case of two fiducials 420. The later embodiment would require a number of knife-edged tools equaling the number of notches 450 corresponding to fiducials 420.

By using either of these two embodiments, an MO disk platter 320 may be created with the servo sectors 410 on the upper surface and the servo sectors 410 on the lower surface in a known rotational alignment, and with the tracks in radial alignment. An alternative embodiment is to use the fiducials 420 to align the top mold with the bottom mold, and simultaneously press both sides of a single unitary blank disk platter. The resulting unitary disk platter would also have the servo sectors 410 on the upper surface and the servo sectors 410 on the lower surface in a known rotational alignment, and the tracks in radial alignment.

The fiducials 420 may further be used to create a stack of MO disk platters 320 where the individual MO disk platters 320 are in a known and useful rotational alignment, and where the tracks on each platter are concentric about the axis of rotation of the spindle 385. In the preferred embodiment of the present invention, the individual platters are mounted on a spindle 385 such that the number 0 servo sector on each disk platter is rotated a predetermined amount with respect to the neighboring platters. In an N platter multi-platter disk 222, it is convenient to use the location of the number 0 servo sector fiducial 430 of the first disk as a reference point, and to rotate the subsequent disks opposite the direction of disk drive rotation. The number 0 servo sector fiducial 430 of the second disk may then be rotated 360/N degrees from the reference point, the number 0 servo sector fiducial 430 of the third disk may be rotated twice 360/N degrees from the reference point, and, in general, the number 0 servo sector fiducial 430 of the Mth disk may be rotated (M-1) 360/N from the reference point.

When an MO disk drive 222 is prepared in this way, it is possible to independently verify the correct operation of the fiber optic switch 350. The means of verification consists of comparing a calculated, anticipated servo sector number with the one actually read by the newly-switched FMO head 370. As an example, consider switching from the head over the upper surface of disk 1 to the head over the lower surface of disk 2 in an N platter disk drive with S servo sectors. As part of the functioning of the servo module 394, it must keep track of the rotational period of the disk platters. Once the servo module 394 achieves track synchronization over the upper surface of disk 1, it knows the points in time when the number 0 servo sector on the upper surface of disk 1 passes the FMO head 370. After switching to the FMO head 370 over the lower surface of disk 2, the servo module 394 reacquires track synchronization after R revolutions. If the servo sector read at R rotational periods after the last number 0 servo sector on the upper surface of disk 1 is the anticipated servo sector number S/N, this serves as an independent verification that the fiber optic switch 350 operated correctly. Conversely, if the servo sector read at R rotational periods after the last number 0 servo sector on the upper surface of disk 1 is also zero, this serves to warn the servo module 394 that the fiber optic switch 350 incorrectly switched to the FMO head 370 over the lower surface of disk 1. Staggering the number 0 servo sectors on the disk platters 320, in conjunction with the operation of the servo module 394, permits comparing an anticipated servo sector number with the servo sector number actually read, and thus creates an independent verification of the correct operation of the fiber optic switch 350.

Figure 5:
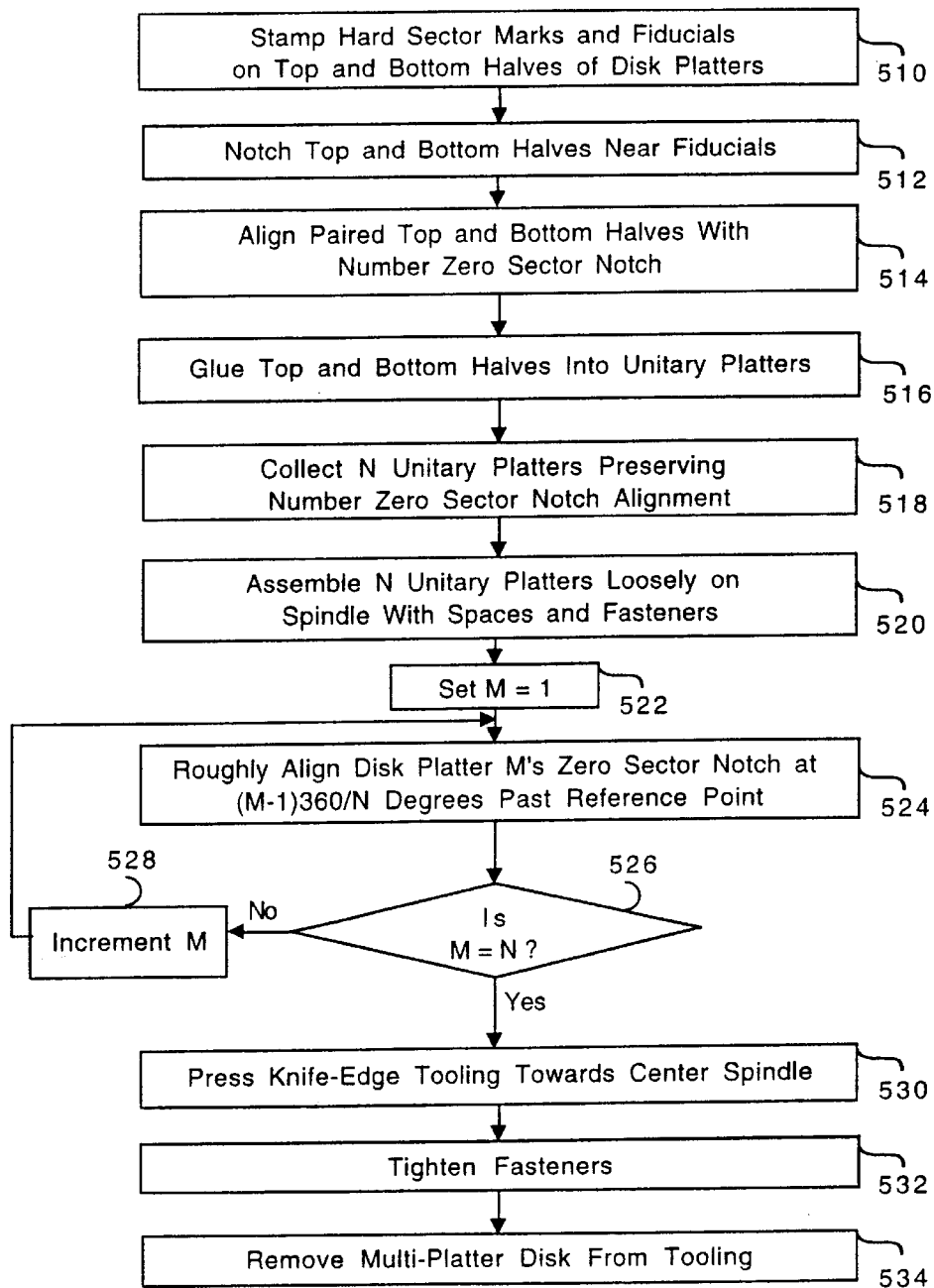
FIG. 5 is a flowchart of preferred method steps for building an N platter disk in known rotational orientation, according to the present invention.

Referring now to FIG. 5, a flowchart of preferred method steps for building an N platter disk in known rotational orientation is shown. To begin, in step 510, a multitude of top halves 400 and bottom halves are stamped with hard-sector markings, and also with N fiducials 420 spaced 360/N degrees apart. It is anticipated that these will be stamped in mass quantities in order to keep the unit cost low.

The top and bottom halves are next sent to a cutting tool, in step 512, which cuts N alignment notches 450 in the edges of the top and bottom halves in precise alignment with the stamped fiducials 420. This use of the cutting tool is preferably under operator control. The operator uses a simple magnifying lens to find and identify the fiducials 420, and aligns the fiducials 420 with the cutting tool. The cutting tool is thus able to cut alignment notches 450 in precise alignment with the stamped fiducials 420. At the last stage of the cutting process, the operator places the notched top and bottom halves in separate assembly racks with the number 0 sector notch 460 in a known position.

The top and bottom halves are next sent to a gluing station. From the separate assembly racks containing top and bottom halves, one top half 400 and one bottom half are selected at a time, the number 0 sector notch 460 position being preserved by the assembler. In step 514, the selected top and bottom halves are placed into a gluing tool, consisting of N knife-edged blades facing a common axis at 360/N degree spacing, with the glue sides of the top and bottom halves facing each other and the number 0 sector notches 460 both in the same knife-edged blade. In step 516, glue is applied to the glue sides of the top and bottom halves, and the halves are moved together until they contact. The N knife-edged blades are then pressed together towards their common axis, and held in that position during the glue setting time. After the glue has set, the unified disk platter may be removed from the gluing tool and set, in step 518, into another assembly rack, with the number 0 sector notch 460 again in a known orientation. From this point on, the top and bottom halves of this disk platter are in a known rotational orientation with respect to one another. From the assembly rack containing unified disk platters, N platters 320 are next selected for assembling on a spindle 385 while preserving the orientation of the number 0 sector notch 460.

After being loosely assembled on the spindle 385 with the required spacers and fasteners, in step 520, the N platter assembly is put into an alignment assembly tool. The alignment assembly tool is similar to the above gluing tool, as it contains N knife-edged blades, separated by 360/N degrees, facing a common axis. One of these N blades will be marked as the reference blade. The assembler rotates the first disk platter 320, in steps 522 and 524, so that the number 0 sector notch 460 of the first disk is placed against the reference blade. Progressing through steps 526, 528, and 524, the assembler next rotates the second disk platter 320 opposite the direction of disk rotation so that the number 0 sector notch 460 of the second disk is placed against the blade that is one removed from the reference blade. The assembler continues in this manner, repeating steps 526, 528 and 524, rotating the Mth disk platter 320 opposite the direction of disk rotation so that the number 0 sector notch 460 of the Mth disk is placed against the blade that is (M-1) blades removed from the reference blade, until all the N disk platters 320 have been loosely orientated, when the Yes branch of step 526 is reached.

The assembler then, in step 530, squeezes the knife-edged blades towards the spindle to accurately align the N disk platters 320. This procedure of squeezing the knife-edged blades together aligns the platters rotationally, due to the wedge-shaped notches, and also aligns the platters radially, due to the bottom of the wedge being aligned to the tracks by the fiducial markings. At this time, in step 532, the fasteners holding the disk platters 320 and spacers together are tightened. After the fasteners are tightened, the alignment tool may now, in step 534, be loosened and removed. The multi-platter disk assembly is now ready to be mounted in a disk drive assembly 222. The rotational alignment of the servo sectors on the N disk platters 320 may now be determined to a useful accuracy. In additional, the tracks on the surfaces of the platters are now in good radial alignment.

The invention has been explained above with reference to a preferred embodiment. Other embodiments will be apparent to those skilled in the art in light of this disclosure. For example, the present invention may readily be implemented using configurations other than those described in the preferred embodiment above. The angles between fiducials are not critical to the calculation of an anticipated servo sector after head switching. The method of the preferred embodiment merely aids in dynamic rotational balance. Additionally, the present invention may effectively be used in conjunction with systems other than the one described above as the preferred embodiment, such as other kinds of hard-sectored optical disk drives. Therefore, these and other variations upon the preferred embodiments are intended to be covered by the present invention, which is limited only by the appended claims.

What is claimed is:

1. An optical disk drive, comprising:
    at least one disk platter including:
        a top half having an upper surface adjacent thereto; and
        a bottom half glued to said top half and having a lower surface adjacent to said bottom half;
        said upper surface being stamped with a first plurality of fiducials; and servo-sector marks
        said lower surface being stamped with a second plurality of fiducials;
        each of said first and second plurality of fiducials having a precise location mark for radially and rotationally aligning said top and bottom half, and a sequence mark readable by a human assembler using a standard assembly-line magnifier; and
        means for reading or writing information to or from said at least one disk platter.

2. The disk drive of claim 1 wherein one of said first plurality of fiducials is in predetermined rotational alignment with one of said second plurality of fiducials.

3. The disk drive of claim 2 wherein said first plurality of fiducials and said second plurality of fiducials include notches cut into said top half and said bottom half.

4. The disk drive of claim 3 further comprising a spindle whereon said disk platters are mounted, each of said disk platters is rotated a predetermined angle with respect to others of said disk platters.

5. The disk drive of claim 4 wherein said predetermined angle is an angle between said notches.

6. The disk drive of claim 1 wherein one of said first plurality of fiducials is in radial alignment with one of said second plurality of fiducials.

7. The disk drive of claim 6 wherein said first plurality of fiducials and said second plurality of fiducials include notches cut into said top half and said bottom half.

8. A method for building an optical disk platter with predetermined servo-sector alignment on upper and lower surfaces, comprising:

creating top half and bottom half molds each with servo-sector marks and fiducials aligned with said servo-sector marks;

stamping a top half blank with said top half mold and a bottom half blank with said bottom half mold to form a top half and a bottom half each with stamped servo-sectors and fiducials, said fiducials each having a precise location mark for rotationally and radially aligning said top half and said bottom half, and a sequence mark readable by a human assembler using a standard assembly-line magnifier;

aligning said stamped fiducials of said top half with said stamped fiducials of said bottom half; and gluing said top half to said bottom half.

9. A method of building a multi-platter optical disk drive with predetermined servo-sector alignment among the platters, comprising:

selecting disk platters produced by the method of claim 8;

mounting said disk platters on a spindle; and aligning said disk platters in said predetermined servo-sector order using said fiducials.

10. The method of claim 9 further comprising aligning said disk platters radially using said fiducials.

11. The method of claim 9 wherein said predetermined servo-sector order comprises rotating a reference servo-sector on the number M disk platter of said disk platters (M-1)360/N degrees away from said reference servo-sector on the number 1 disk platter of said disk platters, where N is the quantity of said disk platters.

12. The method of claim 11 wherein said fiducials and said notches are evenly distributed at angles 360/N degrees apart.

13. A method for building an optical disk platter with predetermined servo-sector alignment on upper and lower surfaces, comprising:

creating top half and bottom half molds each with servo-sector marks and fiducials aligned with said servo-sector marks;

stamping a top half blank with said top half mold and a bottom half blank with said bottom half mold to form a top half and a bottom half each with stamped servo-sectors and fiducials;

cutting notches into said top half and said bottom half adjacent to said top half fiducials and said bottom half fiducials;

aligning said stamped fiducials of said top half with said stamped fiducials of said bottom half by pressing knife edged tools into said notches; and gluing said top half to said bottom half.

* * * * *